United States Patent [19]

Hollingsworth

[11] Patent Number: 4,479,283
[45] Date of Patent: Oct. 30, 1984

[54] METHOD OF AND APPARATUS FOR STUFFING FOODSTUFF INTO A CASING

[75] Inventor: William C. Hollingsworth, Sheboygan, Wis.

[73] Assignee: H-Worth, Inc., Sheboygan, Wis.

[21] Appl. No.: 339,996

[22] Filed: Jan. 18, 1982

[51] Int. Cl.³ .................... A22C 13/02; B65B 43/42; B65B 9/06
[52] U.S. Cl. .......................... 17/49; 17/41; 53/550; 53/576
[58] Field of Search ................ 17/41, 42, 49; 53/550, 53/551, 576

[56] References Cited

U.S. PATENT DOCUMENTS

| | | | |
|---|---|---|---|
| 1,353,210 | 9/1920 | Bates | 53/139 X |
| 1,455,383 | 5/1923 | Bates | 225/53 |
| 1,546,361 | 7/1925 | Bates | 53/139 |
| 2,234,054 | 3/1941 | Mason | 17/49 |
| 2,773,773 | 12/1956 | Harder et al. | 17/49 |
| 2,788,279 | 4/1957 | Luer, Jr. | 17/49 |
| 3,222,192 | 12/1965 | Arnold et al. | 17/42 X |
| 3,703,796 | 11/1972 | Inoue | 53/551 X |
| 3,748,690 | 7/1973 | Niedecker | 17/33 |
| 4,084,999 | 4/1978 | Rucker | 53/551 X |
| 4,136,505 | 1/1979 | Putnam, Jr. et al. | 53/551 |
| 4,288,965 | 9/1981 | James | 53/551 X |
| 4,355,494 | 10/1982 | Tilman | 53/551 X |
| 4,358,873 | 11/1982 | Kollross | 17/41 X |

Primary Examiner—Willie G. Abercrombie
Attorney, Agent, or Firm—Senniger, Powers, Leavitt and Roedel

[57] ABSTRACT

Methods of and apparatus for stuffing foodstuff into a casing, more particularly a method and apparatus for stuffing foodstuffs such as sausage meat or hams which are to be cured by smoking into a casing of fibrous material suitable for the smoking of the foodstuff, in which the casing is formed from flat web stock, the web being fed forward from a supply roll and formed into a tubular casing, the casing being fed forward along a stuffing tube through which the foodstuff is forced into the casing.

14 Claims, 9 Drawing Figures

METHOD OF AND APPARATUS FOR STUFFING FOODSTUFF INTO A CASING

BACKGROUND OF THE INVENTION

This invention relates to methods of and apparatus for stuffing foodstuff into a casing, more particularly a method and apparatus for stuffing foodstuffs such as sausage meat or hams which are to be cured by smoking into a casing of fibrous material suitable for the smoking of the foodstuff.

The invention is especially concerned with the stuffing of sausage meat into a casing of fibrous material such as presently widely used for sausage meat which is to be smoked, but is also concerned with the stuffing of other foodstuffs, such as hams, for example, into such a casing.

Conventionally, the operation of stuffing sausage meat into a casing of fibrous material suitable for the smoking of the sausage has been carried out with equipment comprising an extruder having a pump for pumping sausage meat through a horizontal pump nozzle or stuffing tube, the casing being supplied as pre-formed tube stock (generally approximately 50–80 feet long), each such 50–80 foot length being shirred or rucked to be in collapsed accordion-pleated condition with the total length of the shirred casing about 15 inches. The 15 inch length of shirred casing is slipped over the stuffing tube and trained through a sizing ring and into a clipping mechanism, in which its leading end is clipped closed by a metal clip. Sausage meat is extruded into the casing, pushing it forward off the stuffing tube, and after a predetermined quantity of sausage meat, the amount for one sausage or "chub" or "loaf" as it is called, has been stuffed into the casing, a clip is applied. Then another clip is applied generally about one inch away, and the procedure repeated until a string of sausages ("chubs" or "loaves") comprising a desired number of sausages ("chubs" or "loaves") is completed (e.g. three or four sausages), at which point a knife cuts off the string between a pair of the one-inch-spaced clips. A cord may be provided for each string of sausages when the desired count (i.e., number of sausages in the string of sausages) is reached, for the purpose of hanging the string in the smoking process.

The above-described conventional method has presented serious problems in that the cost of providing the shirred casing for application to the stuffing tube is relatively high and, in addition, the rate of productivity is relatively low because a new supply of the shirred casing (the 50–80 foot length of casing shirred or pleated to 15 inches) has to be slipped on the stuffing tube when the previous supply has been exhausted, and the extruder and clipping mechanism are thus idled for substantial periods of time. For example, with the 50–80 foot lengths of shirred casing, there are down times for casing replenishment after approximately 50–80 completed individual sausages ("chubs" or "loaves").

SUMMARY OF THE INVENTION

Accordingly, among the several objects of the invention may be noted the provision of an improved method of stuffing foodstuff (e.g. sausage meat, hams) into a fibrous casing suitable for the smoking of the product, economically utilizing a continuous web of the fibrous material drawn from a supply, generally a supply roll of the material, and forming it into tubing constituting the casing as it is fed forward, as distinguished from using individual finite shirred lengths of pre-formed tubing, thus minimizing down time; the provision of apparatus for economically and effectively carrying out this method, said apparatus being adapted readily to utilize and readily applicable to existing extruding and clipping equipment to enable sausage manufacturers to convert their operations for utilization of rolls of flat fibrous web stock without having to scrap their basic stuffing equipment (extruder and clipping apparatus); and the provision of such a method and apparatus adapted for stuffing into a casing individual items to be smoked such as hams as well as extrudable foodstuff such as sausage meat.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
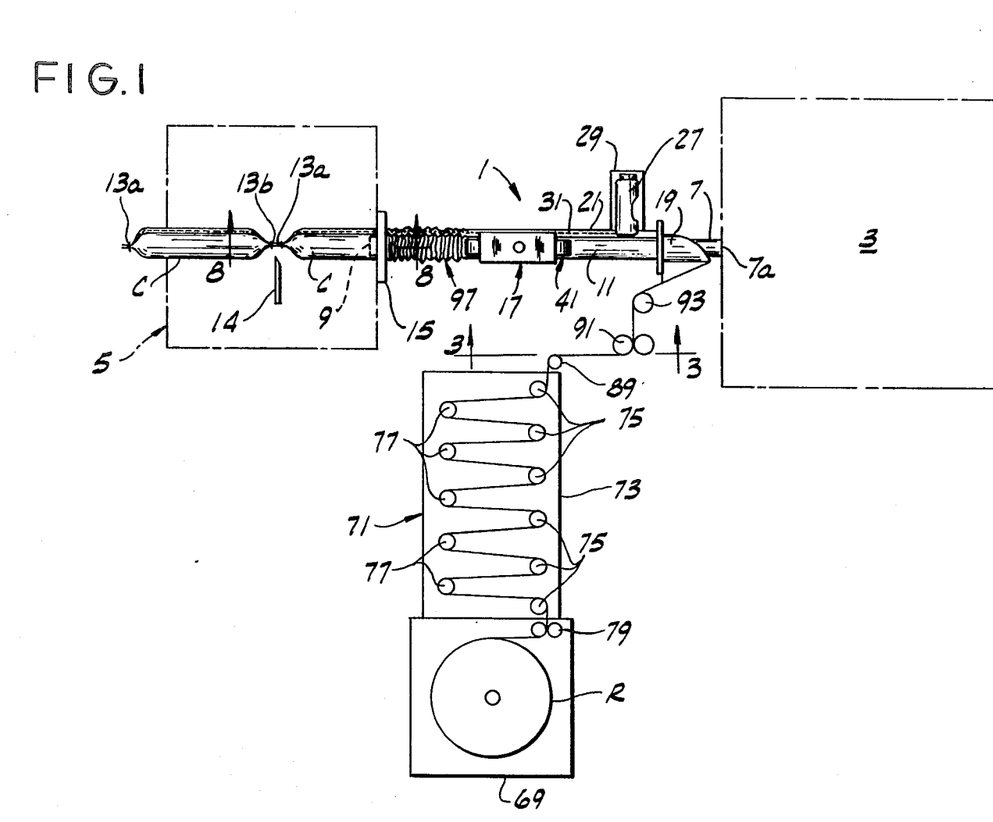
FIG. 1 is a generally diagrammatic plan of apparatus of this invention for stuffing sausage meat into a casing in which a web of casing material is fed forward from a supply roll of the web.

Referring to the drawings, there is generally indicated at 1 in FIG. 1 sausage stuffing apparatus of this invention used in conjunction with an existing sausage meat extruder 3 and a clipping apparatus 5, the two latter items being of a type well-known in the art and not requiring detailed description. It should suffice to say that the extruder 3 functions to force ground sausage meat (e.g. for what is called summer sausage) through a so-called pump nozzle or stuffing tube 7 extending horizontally forward from the extruder and extruding the meat through the discharge (downstream) end of the tube which is indicated at 9 in FIGS. 1 and 8. The meat is extruded into a sausage casing generally designated 11, which comprises tubing formed of a fibrous material, generally a cellulose paper material having a stretch characteristic which is suitable for being stuffed with the meat and holding it for being smoked, such material being well-known in the sausage stuffing art. It will be understood that the casing is left on after smoking for certain types of sausage, e.g. summer sausage, but removed for others, e.g., luncheon meat.

The clipping apparatus 5, also conventional, comprises means for applying fasteners, and in particular metal clips, to the casing 11 to subdivide it into individual sausage units or sausages, often referred to as "chubs" or "loaves", each having a predetermined quantity of sausage meat stuffed therein. Each such chub is designated by the reference character C. The operation proceeds by actuation of the clipping apparatus to apply a clip to the casing 11 at its leading end, followed by actuation of the extruder 3 to extrude a metered amount of sausage meat into the casing as thus end-closed, followed by application of another clip to the casing to close the trailing end of the chub or loaf thus produced, followed by application of another clip to the casing spaced a short distance, for example one inch, from the trailing clip and constituting the leading end clip for the next chub or loaf to be formed. The leading end clips are designated 13a and the trailing end clips are designated 13b. When the desired number of chubs or loaves C for a string of chubs or loaves has been formed, e.g., three or four chubs or loaves, a knife 14 in the clipping apparatus cuts the casing between the trailing clip 13b of the trailing chub or loaf of the string and the leading clip 13a of the next chub or loaf to be formed. The casing, as it feeds off the discharge end 9 of the stuffing tube passes through a ring 15 (on the trailing side of the clipping apparatus) which functions to size the chubs or loaves, i.e., to determine their diameter and length.

The extruder 3, with a stuffing tube 7, and the clipping apparatus 5, with a sizing ring 15, may be items of equipment already in situ at the sausage manufacturer's plant, having been used in the above-noted conventional style of operation. Generally, the clipping apparatus is mounted to be swung into and out of position at the discharge end of the stuffing tube, for the purpose, in said conventional mode of operation, of applying the shirred finite length of casing to the stuffing tube. The apparatus of this invention comprises a combination casing-forming and shirring assembly indicated in its entirety by the reference numeral 17, including stuffing tube 7 as a replacement for the original stuffing tube, which is mounted in place at the exit side of the extruder 3. The stuffing tube of assembly 17 is generally somewhat longer than the original stuffing tube, e.g. 21 inches instead of 15 inches, and its extrance end (indicated at 7a) is secured (generally threaded) in place extending from the outlet of the extruder in the same manner as the original stuffing tube.

Figure 5:
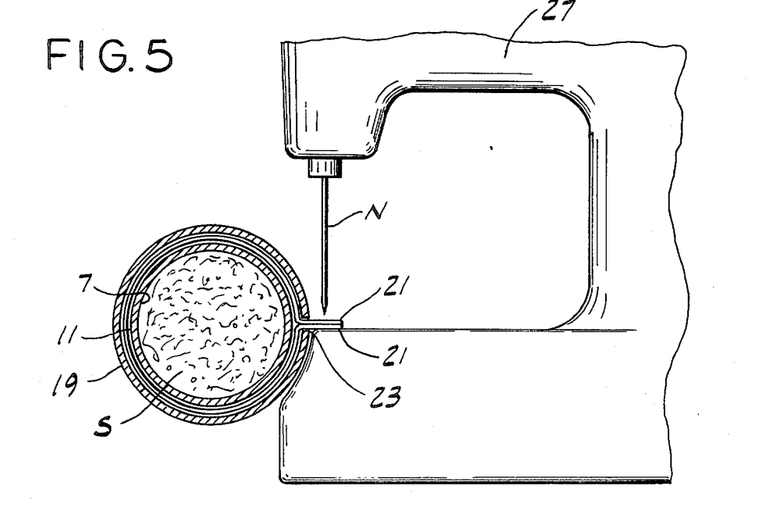

The assembly 17 comprises forming means 19 surrounding the stuffing tube 7 adjacent the extruder 3 for forming into a tubular casing a continuous web W of casing material, generally fibrous casing material suitable for forming a casing for being stuffed with the sausage meat and holding it for being smoked, such material being well known in the art. The web W, which is a flat web of the fibrous material is fed to the forming means from a supply of the material constituted by a roll indicated at R, coming onto the forming means 17 at the stuffing tube 7 and being guided by the forming means from its flat condition into the form of a continuous tubular casing wrapped around or encircling the stuffing tube with the longitudinal margins 21 of the web brought together in inside face to inside face relation extending generally outwardly from the stuffing tube to enable the margins to be stitched together to form a longitudinal seam for the casing. For this purpose, the forming means or forming shoulder, as it is called, is generally in the form of a split collar surrounding the stuffing tube 7 with suitable space therebetween, shaped to guide the web for transition from its flat condition to the form of tubing surrounding the stuffing tube and with the margins 21 of the web brought together in inside face to inside face relation extending radially outwardly from the stuffing tube at one side of the stuffing tube through the split 23 in the collar (see particularly FIG. 5).

Figure 2:
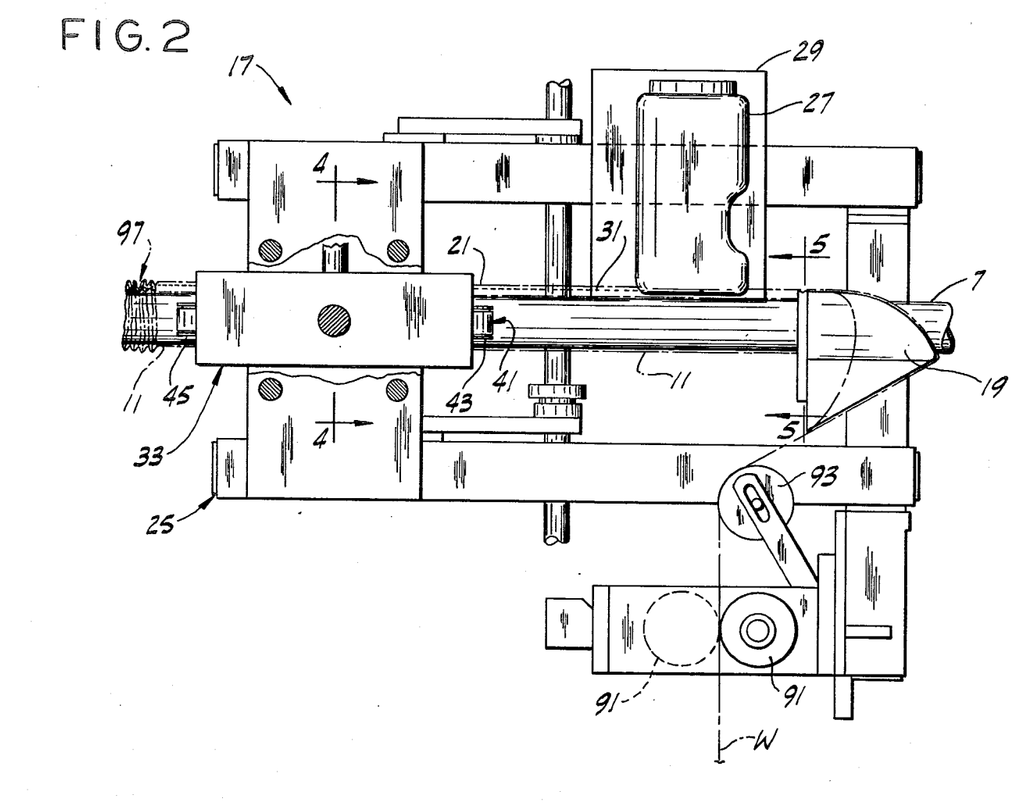
FIG. 2 is a detailed plan of part of the apparatus shown in FIG. 1 on a larger scale than FIG. 1.
Figure 3:
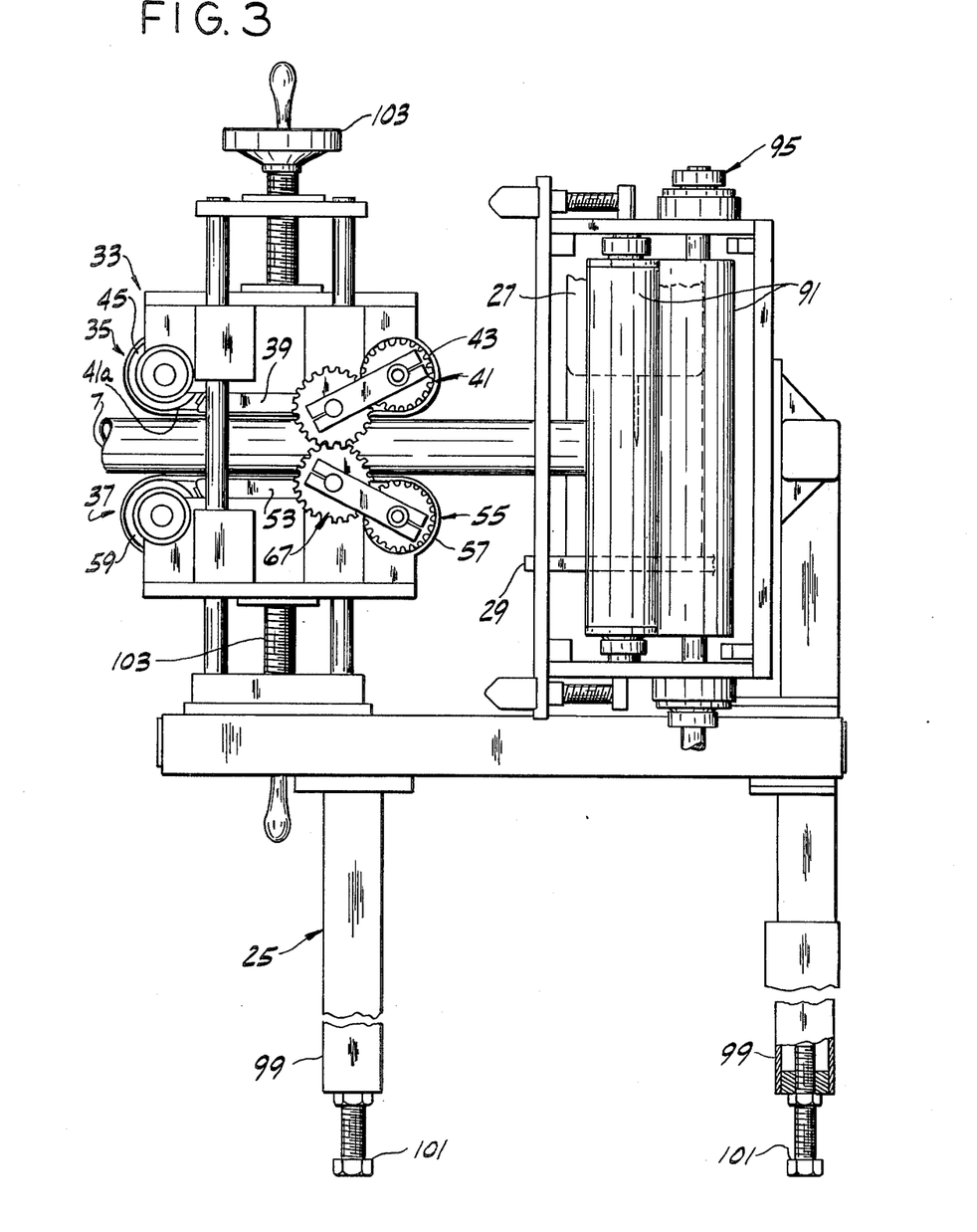
FIG. 3 is a view in side elevation of part of the apparatus, generally as viewed from line 3—3 of FIG. 1.
Figure 4:
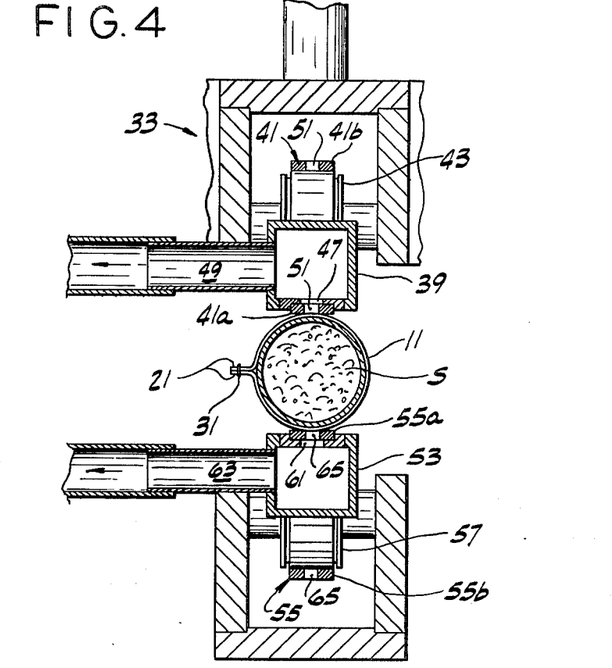
FIGS. 4 and 5 are vertical transverse sections on lines 4—4 and 5—5, respectively, of FIG. 2.

The assembly 17 comprises a frame indicated generally at 25 in FIGS. 2 and 3 carrying the forming shoulder 19 in position concentric with the stuffing tube 7. A sewing machine 27 is carried by the frame downstream from the forming shoulder for stitching together the margins 21 of the web in the casing 11 to form a longitudinal sewn seam for the casing 11. The margins 21 extend out (resembling a fin) from one side of the stuffing tube and the sewing machine is mounted on a platform 29 at that side of the stuffing tube. The arrangement is such that the sewing machine functions to stitch the margins together as indicated at 31 to form a longitudinal sewn seam for the casing 11, the latter surrounding the stuffing tube 7 and having a relatively snug fit on the stuffing tube but being able to slide forward on the stuffing tube.

At 33 is indicated means downstream from the sewing machine engageable with the casing 11 on the stuffing tube 7 for feeding the casing forward. This means is shown as comprising an upper vacuum belt means 35 and a lower vacuum belt means 37, each carried by the frame 25. The upper vacuum belt means comprises an elongate vacuum box 39 extending lengthwise of the stuffing tube 7 above the tube, and a flat belt 41 trained around a pulley 43 at the rear end of the box and a pulley 45 at the forward end of the box to have a horizontal forward-moving lower reach 41a travelling along the bottom of the box, and an upper return reach 41b. The box has a longitudinal slot 47 at the bottom and a vacuum connection 49 to a vacuum pump for drawing a vacuum in the box. The belt 41 has vacuum holes 51 in register with the slot. The lower vacuum belt means comprises an elongate vacuum box 53 extending lengthwise of the stuffing tube 7 below the tube, and a flat belt 55 trained around a pulley 57 at the rear end of the box and a pulley 59 at the forward end of the box to have a horizontal forward-moving upper reach 55a travelling along the top of the box, and a lower return reach 55b. Box 53 has a longitudinal slot 61 at the top and a connection 63 to the vacuum pump for drawing a vacuum in it. Belt 55 has vacuum holes 65 in register with slot 61. The two vacuum belts are driven by means including gearing such as indicated at 67, the arrangement being such that the forward-moving lower reach 41a of belt 41 vacuum-grips the casing 11 at the top and the forward-moving upper reach 55a of belt 55 vacuum-grips the casing 11 at the bottom and feeds the casing forward on the stuffing tube 7.

Figure 6:
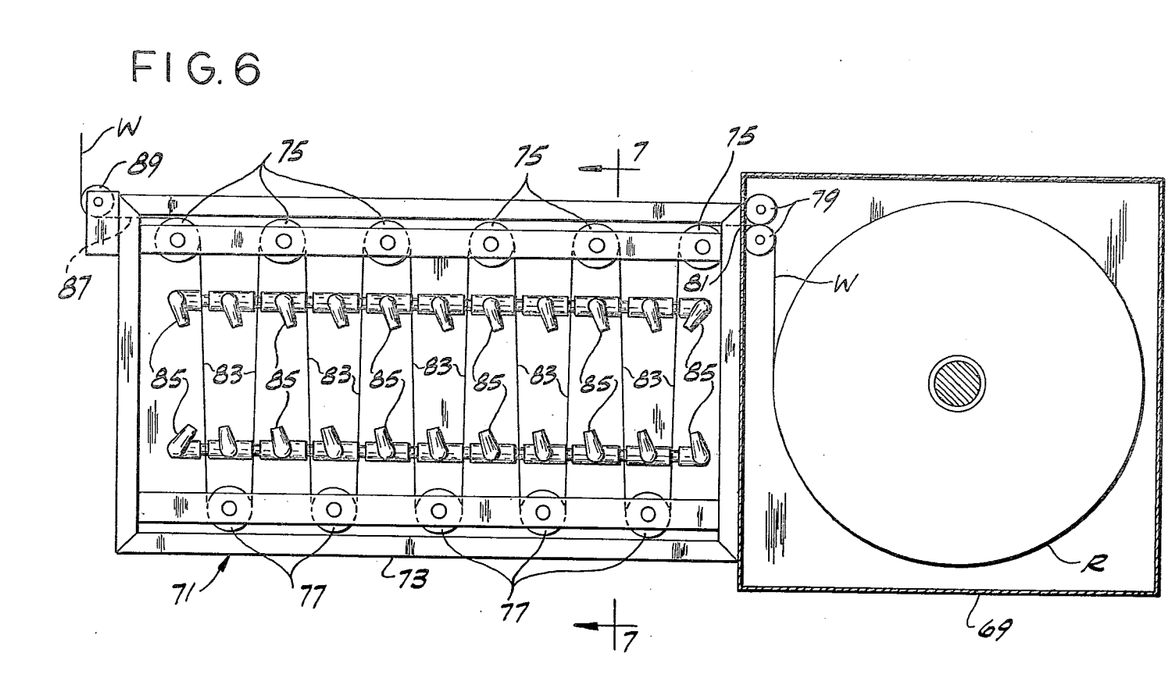
FIG. 6 is an enlarged detailed plan of means for wetting the web of casing material as it is fed forward from the supply roll.
Figure 7:
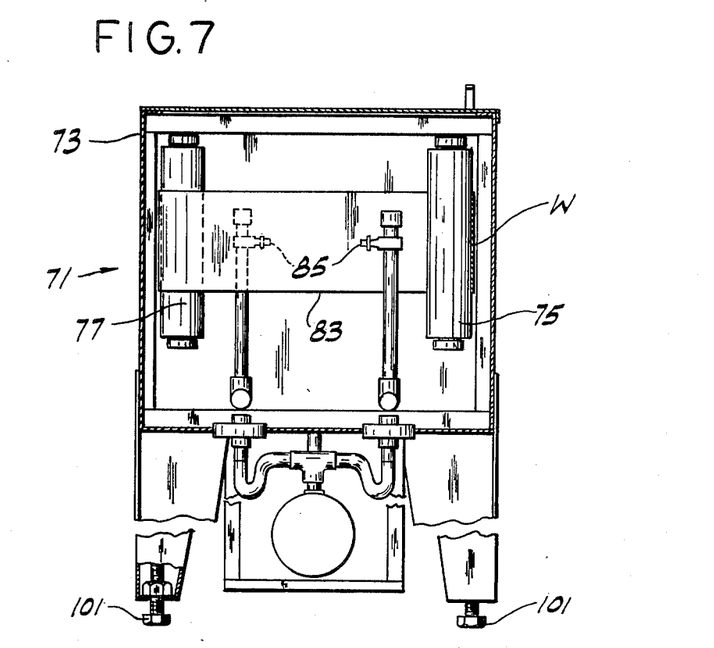
FIG. 7 is a vertical longitudinal section of the wetting means on line 7—7 of FIG. 6.

As shown in FIGS. 1 and 6, the roll R of the fibrous casing material is held by a roll holder 69 in vertical position for being fed to the forming shoulder 19, and is fed to the latter through means generally designated 71 for wetting the casing material with water (generally with hot water) as it travels forward from the roll R to the forming shoulder. In travelling through the wetting means, the casing material (web W) is sufficiently soaked for the purpose (a) in the case of sausage on which the casing is to remain, e.g. summer sausage, to activate a coating such as is usually provided on fibrous casing material for such sausage to cause the sausage meat to adhere to the casing, and also to soften the material to allow the casing to stretch during the stuffing operation, or (b) in the case of sausage from which the casing is to be removed, e.g. luncheon meat, to activate a coating of a release agent such as is usually provided on the casing material enabling the casing to be removed, and also to soften the material to allow the casing to stretch during the stuffing operation. The means 71 for wetting the web comprises a tank 73 having a first set of vertical guide rolls 75 arranged in a vertical plane adjacent one side of the tank and a second set of vertical guide rolls 77 arranged in a vertical plane adjacent the other side of the tank, these guide rolls being vertically disposed for guiding the web W from side-to-side of the tank in horizontally travelling "festoons" as distinguished from the usual vertical festoons. The web W, unwinding from the supply roll R, is guided by rolls 79 through a vertical slot at 81 at the rear of the tank 73, and is then trained back and forth from side-to-side of the tank around the rolls 75 and 77 to have the horizontally travelling vertical reaches such as indicated at 83 in FIGS. 1 and 6. Spray nozzles such as indicated at 85 are provided for spraying water (generally hot water) on both faces of each reach 83 of the web to soak the web, surplus water being suitably drained off from the bottom of the tank. The soaked web exits from the tank through a slot at 87 at the forward end of the tank and is then guided by a vertical guide roll 89, a pair of vertical feed rolls 91 and a vertical guide roll 93 to the forming shoulder 19. It will be observed that the web needs to be fed to the forming shoulder 19 from the side and hence must come onto the shoulder vertically, and the vertical disposition of the supply roll R eliminates the need for changing direction as would be required with a horizontal disposition of the supply roll.

In the operation of the apparatus, the web W of casing material is drawn by the vertically disposed feed rolls 91 which are driven by a suitable drive as indicated at 95 from the vertically disposed supply roll R through the tank 73. In the course of its passage through the tank, the web travels in a tortuous path around the guide rolls 75 and 77 with reaches 83 between the guide rolls 75 and 77 on opposite sides of the tank in which the web is vertically disposed (i.e., the planes of the reaches 83 are vertical). Water is sprayed on opposite sides of these reaches of the web by the spray nozzles 85 thoroughly to soak the web. The wetted web travels forward from the feed rolls 91 around the vertical guide roll 93 to the forming shoulder 19, coming onto the shoulder from the left as viewed looking downstream of the stuffing tube, and then passes over the shoulder which forms it into continuous tubing constituting the casing 11 around the stuffing tube 7 with the side margins 21 of the web brought together in inside face to inside face relation and extending laterally outwardly from the stuffing tube at the right side of the stuffing tube as viewed looking downstream of the stuffing tube, the margins 21 thereby being in position for being stitched together by the sewing machine 27 to form the longitudinal sewn seam 31 for the casing.

The casing 11 is pulled over the forming shoulder 19 and pulled forward on the stuffing tube 7 by the vacuum belts 41 and 55. The web W is maintained under some tension from the feed rolls 91 to the forming shoulder 19 and the casing 11 is maintained under some tension from the forming shoulder 19 to the vacuum belts by the forward pull of the belts on the tubing. The belts function to draw the casing through the sewing machine with the side margins 21 of the web in the casing passing over the bed of the sewing machine in the line of the needle N of the sewing machine for the stitching together of the margins 21. Preferably, the margins are as narrow as possible and in order that they be narrow the feed of the casing through the sewing machine is by means of the vacuum belts 41 and 55 and special feed dog.

Figure 8:
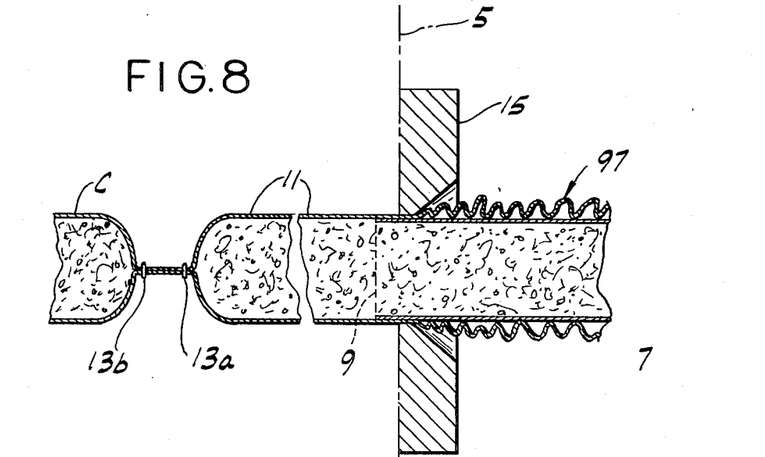
FIG. 8 is an enlarged section generally on line 8—8 of FIG. 1.

The vacuum belts 41 and 55 feed the seamed casing 11 forward on the stuffing tube 7 toward the sizing ring 15 and the casing, in being so fed forward, becomes shirred or rucked on the stuffing tube as indicated at 97 in FIGS. 1 and 8. It is believed this shirring of the casing occurs because of friction between the casing and the stuffing tube and/or surface tension of the casing (which is wet) on the stuffing tube impeding the forward movement of the casing on the stuffing tube away from the downstream end of the forward-moving reaches 41a and 55a of the vacuum belts 41 and 55 while these belt reaches are pushing the casing forward. In any event, the casing shirs or rucks up on the stuffing tube forward of the vacuum belts to provide a supply of shirred tubing as indicated at 97 in FIGS. 1 and 8 on the stuffing tube adjacent the discharge or exit end 9 of the stuffing tube.

The casing 11 extends through the sizing ring 15 and forward off the discharge end 9 of the stuffing tube 7. At the start of operations, the clipping apparatus applies a clip 13a to the leading end of the casing just downstream from the discharge end of the stuffing tube, this clip providing a leading end closure for a unit length of the casing (i.e., a sausage length or "chub" or "loaf"). Upon application of this clip to the leading end of the casing, a measured amount of the foodstuff, such as sausage meats, to be stuffed into the casing is forced through the stuffing tube and extruded out of the discharge (downstream) end 9 of the stuffing tube and into the casing. The sausage meat entering the casing (and acting against the clip or closure 13a) acts to draw the casing forward from the shirred supply at 97 off the end 9 of the stuffing tube to provide a unit length of the casing in which the sausage meat is stuffed. Discharge of the sausage meat is then cut off, and the clipping apparatus applies a clip 13b to the casing to close the casing at the trailing end of the stated unit length, thereby providing a trailing end closure for the unit length to form a chub or loaf.

The clipping apparatus then functions to apply a clip 13a to the casing to close it at a point somewhat upstream from the clip 13b (e.g., one inch away) to provide the leading end closure for the next unit length, i.e. the next chub or loaf. The closing and stuffing steps are repeated until a string of chubs or loaves with a desired number of chubs or loaves in the string for hanging for smoking is completed (e.g., three or four chubs or loaves), the casing is cut between the trailing clip 13b of the last chub or loaf in the string and the leading clip 13a for the next chub or loaf, another string of chubs or loaves is formed, and so on.

Generally, in the above-described operation of the apparatus for sausage stuffing, the web W is fed forward continuously by the feed rolls 91 and the vacuum belts 41 and 55 from the supply roll R through the tank 73, over the forming shoulder 19, through the sewing machine 27 and to a point just downstream from the downstream end of the forward-moving reaches 41a and 55a of the vacuum belts, where it accumulates on the stuffing tube 7 in the shirred supply or reserve at 97. The discharge of the metered quantities of sausage meat from the stuffing tube 7 for stuffing is intermittent, and the provision of the shirred supply 97 of casing on the stuffing tube enables the intermittent stuffing of the casing, by permitting intermittent withdrawal of the casing from the shirred supply, with continuous replenishment of the shirred supply.

As appears in FIG. 3, the frame 25 has legs 99 including adjustable feet 101 for adjusting its height for interfitting it with an existing extruder 3 and clipping apparatus 5, and the roll holder 69 and tank 73 may have a similar adjustment feature so that the web is guided to the forming shoulder 19 at the proper elevation. The roll holder may have suitable braking means for the roll R for web tensioning purposes. It is contemplated that stuffing tubes of different diameters may be used and for this purpose the forming shoulder 19 may be made to be readily removable and replaceable with others for different sized stuffing tubes, the sewing machine platform 29 may be suitably mounted for adjustment transversely of the apparatus, and the vacuum belts may be suitably mounted for adjustment up and down, such adjustment being generally indicated at 103 in FIG. 3. The drive at 67 permits this adjustment. And sizing ring 15 is adjustable, this being conventional.

Figure 9:
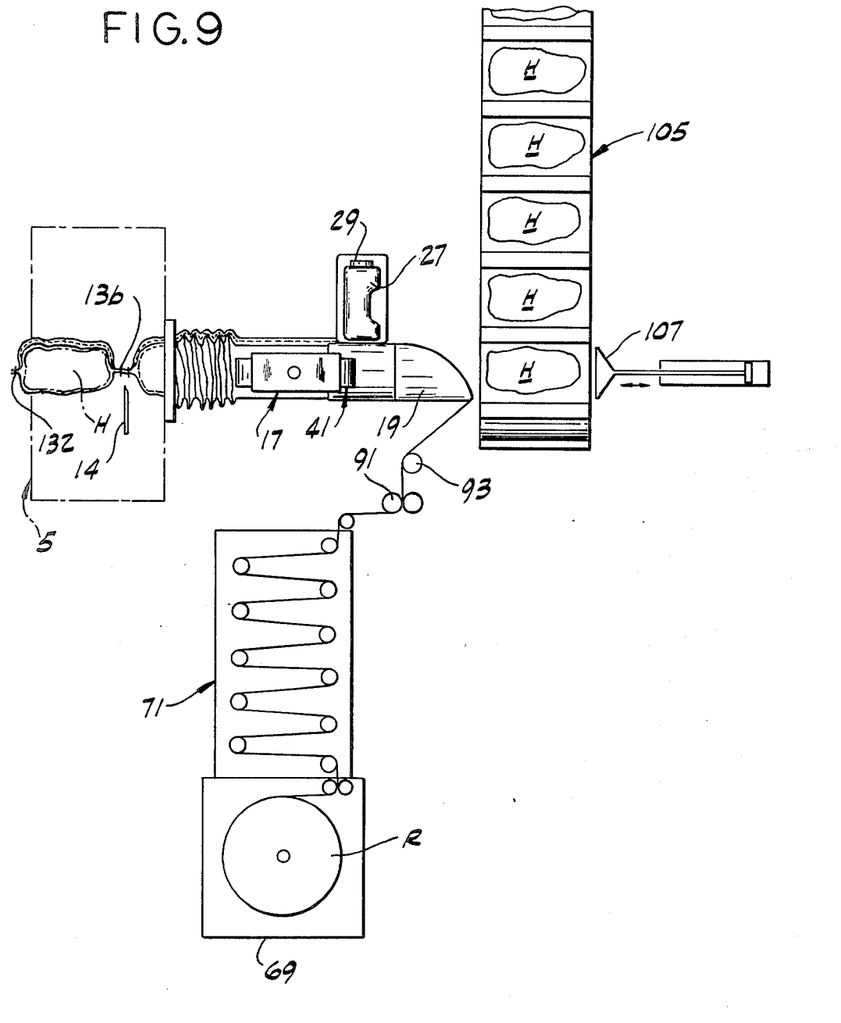
FIG. 9 is a view similar to FIG. 1 showing a modification of the apparatus of this invention for stuffing individual items such as hams into a casing, again in which a web of casing material is fed forward from a supply roll of the web.

FIG. 9 illustrates another embodiment of the invention in which the foodstuff being stuffed into the casing comprises individual items, e.g. individual hams H, instead of a pumpable and extrudable foodstuff such as sausage meat. In this embodiment, the items to be stuffed into the casing are intermittently delivered to the entrance end of the stuffing tube by a conveyor 105 and pushed through the stuffing tube 7 by a ram 107. The items are intermittently pushed forward through the stuffing tube one after another at intervals so that there are spaces between successive items.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of stuffing sausage meat, which is to be smoked, into a casing of material suitable for the smoking of the sausage meat, comprising:
   continuously feeding forward a continuous web of casing material from a supply thereof toward a stuffing tube extending horizontally forward from an extruder for forcing sausage meat through the tube from one end thereof to exit from its other end constituting its discharge end;
   continuously forming the web of casing material into continuous tubing surrounding the stuffing tube with the side margins of the web brought together in inside face to inside face relation extending outwardly with respect to the stuffing tube;
   continuously feeding the tubing forward in the direction toward the discharge end of the stuffing tube and, as it is fed forward, continously stitching the side margins together as they extend outwardly to complete the formation of a tubular casing with a longitudinal sewn seam;
   the casing surrounding the stuffing tube and extending lengthwise with respect to the stuffing tube with said seam on the outside of the casing throughout the length of the stuffing tube;
   continously feeding the casing with said seam on the outside forward surrounding the stuffing tube toward the discharge end of the stuffing tube;
   shirring the casing surrounding the stuffing tube to provide a supply of shirred casing surrounding the stuffing tube, the casing extending off the discharge end of the stuffing tube;
   closing the casing downstream from the downstream end of the stuffing tube thereby providing a leading end closure for a unit length of the casing;
   intermittently forcing sausage meat through the stuffing tube out of its discharge end and into the casing, the sausage meat entering the casing acting to draw the casing forward from the shirred supply off the discharge end of the stuffing tube to provide a unit length of the casing in which the sausage meat is stuffed;
   closing the casing at the trailing end of the unit length to provide a trailing end closure for the unit length;
   again closing the casing at a point upstream form the said trailing end closure to provide a leading end closure for the next unit length; and
   repeating the closing and sausage meat forcing steps.

2. The method of claim 1 wherein the tubing is formed with said side margins extending laterally outwardly at one side of the stuffing tube for being stitched together to form the longitudinal sewn seam for the casing.

3. The method of claim 1 wherein water is sprayed on the web to moisturize it as it is fed forward from the supply toward the stuffing tube.

4. The method of claim 2 wherein the web is fed toward the stuffing tube from a vertically disposed web supply roll in a tortuous path with horizontally travelling reaches in which the web is vertically disposed, and wherein the water is sprayed on the web along said path.

5. The method of claim 3 wherein the web is fed toward the stuffing tube from a vertically disposed web supply roll in a tortuous path with horizontally travelling reaches in which the web is vertically disposed, and wherein water is sprayed on the web along said path.

6. Apparatus for stuffing sausage meat, which is to be smoked, into a casing of material suitable for the smoking of the sausage meat comprising:
   means for feeding forward a continuous web of casing material from a supply thereof toward a stuffing tube extending horizontally forward from an extruder for forcing sausage meat through the tube from one end thereof to exit from its other end constituting its discharge end, with the web traveling continuously toward the stuffing tube;
   means for continuously forming the web of casing material into continuous tubing surrounding the stuffing tube with the side margins of the web brought together in inside face to inside face relation extending outwardly with respect to the stuffing tube;
   means for continuously feeding the tubing forward in the direction toward the discharge end of the stuffing tube and, as it is fed forward, continuously stitching the side margins together as they extend outwardly to complete the formation of a tubular casing with a longitudinal sewn seam;

the casing surrounding the stuffing tube and extending lengthwise with respect to the stuffing tube with said seam on the outside of the casing throughout the length of the stuffing tube;

means for continuously feeding the casing with said seam on the outside forward surrounding the stuffing tube and causing it to become shirred surrounding the stuffing tube to provide a supply of shirred casing surrounding the stuffing tube, the casing extending off the discharge end of the stuffing tube; whereby the casing may be closed downstream from the discharge end of the stuffing tube to provide a leading end closure for a unit length of the casing;

whereby sausage meat may be intermittently forced through the stuffing tube out of its discharge end and into the casing, the sausage meat entering the casing acting to draw the casing forward form the shirred supply off the discharge end of the stuffing tube to provide a unit length of the casing in which the sausage meat is stuffed;

whereby the casing may be closed at the trailing end of the unit length to provide a trailing end closure for the unit length;

whereby the casing may again be closed at a point upstream from the said trailing end closure to provide a leading end closure for the next unit length; and whereby the closing and sausage meat forcing steps may be repeated.

7. Apparatus as set forth in claim 6 for installation in association with previously installed sausage meat extruding and clipping equipment, comprising a frame carrying the stuffing tube, the forming means, the stitching means and the means for feeding the casing forward on the stuffing tube, the frame being adapted to be installed between a previously installed extruder and clipping apparatus, the stuffing tube being attached to the extruder, and extending into the clipping apparatus.

8. Apparatus as set forth in claim 7 wherein the forming means comprises a forming shoulder surrounding the stuffing tube for forming the web into the casing around the stuffing tube by wrapping the web around the stuffing tube and bringing the side margins of the web into inside face to inside face relation extending outwardly from the stuffing tube, the stitching means comprising a sewing machine carried by the frame in position to stitch together said side margins as they extend outwardly from the stuffing tube.

9. Apparatus as set forth in claim 8 wherein the forming shoulder is adapted to form the web into the casing surrounding the stuffing tube with the side margins of the web extending laterally outwardly at one side of the stuffing tube, the sewing machine being mounted in the frame with its needle extending generally vertically in position for stitching together said margins.

10. Apparatus as set forth in claim 6 having means for spraying water on the web to moisturize it as it is fed forward from the supply toward the stuffing tube.

11. Apparatus as set forth in claim 9 having means for feeding the web toward the stuffing tube from a vertically disposed web supply roll in a tortuous path with horizontally travelling reaches in which the web is vertically disposed, and wherein the water is sprayed on the web along said path.

12. Apparatus as set forth in claim 10 having means for feeding the web toward the stuffing tube from a vertically disposed web supply roll in a tortuous path with horizontally travelling reaches in which the web is vertically disposed, and wherein water is sprayed on the web along said path.

13. Apparatus for stuffing foodstuff which is to be smoked into a casing of material suitable for the smoking of the product comprising:

a supporting frame;

a stuffing tube through which a foodstuff may be forced from one end to and out its other end constituting its discharge end, said stuffing tube extending horizontally in the frame;

a forming shoulder carried by the frame surrounding the stuffing tube adjacent its said one end for forming a continuous web of casing material into a tubular casing around the stuffing tube by wrapping the web around the stuffing tube and bringing together the side margins of the web in inside face to inside face relation with the margins extending outwardly from the stuffing tube;

means for continuously unwinding a continuous web of the casing material from a supply roll and feeding it toward the forming shoulder;

a sewing machine mounted in the frame for continuously stitching together the margins of the casing on the stuffing tube downstream from the forming shoulder; and means engageable with the casing on the stuffing tube downstream from the sewing machine for continuously feeding the casing forward on the stuffing tube and causing it to become shirred on the stuffing tube to provide a shirred supply of the casing on the tube.

14. Apparatus as set forth in claim 13 wherein said means engageable with the casing on the stuffing tube comprises vacuum belt means.

* * * * *